April 11, 1933.　　　　　R. J. SMITH　　　　　1,903,659
MACHINE AND METHOD FOR APPLYING FASTENER ELEMENTS
Filed Jan. 30, 1932　　　8 Sheets-Sheet 2
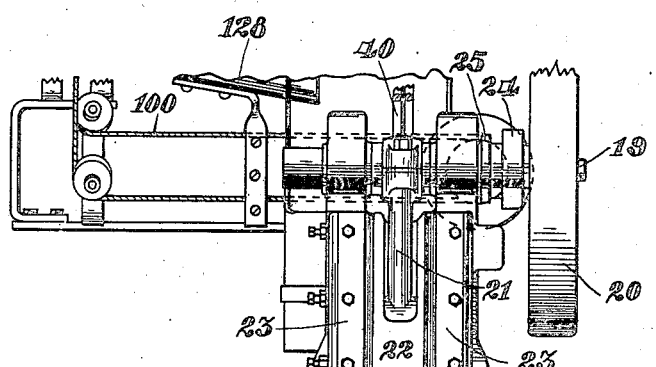
Fig.2.
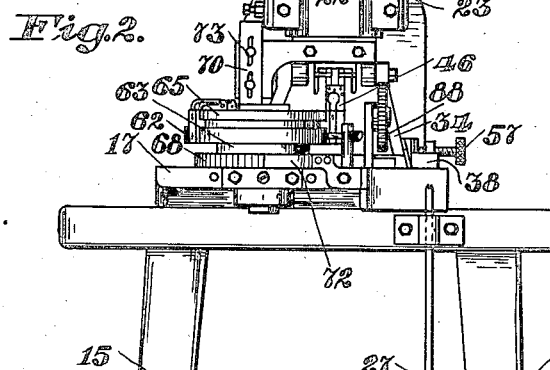
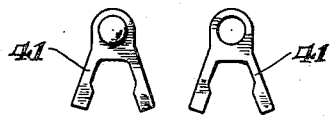
Fig.3.
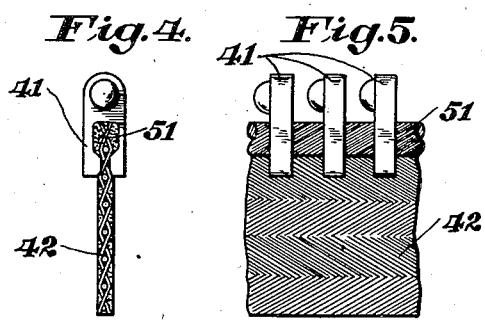
Fig.4.　Fig.5.
INVENTOR.
Roscoe J. Smith
BY
ATTORNEY.

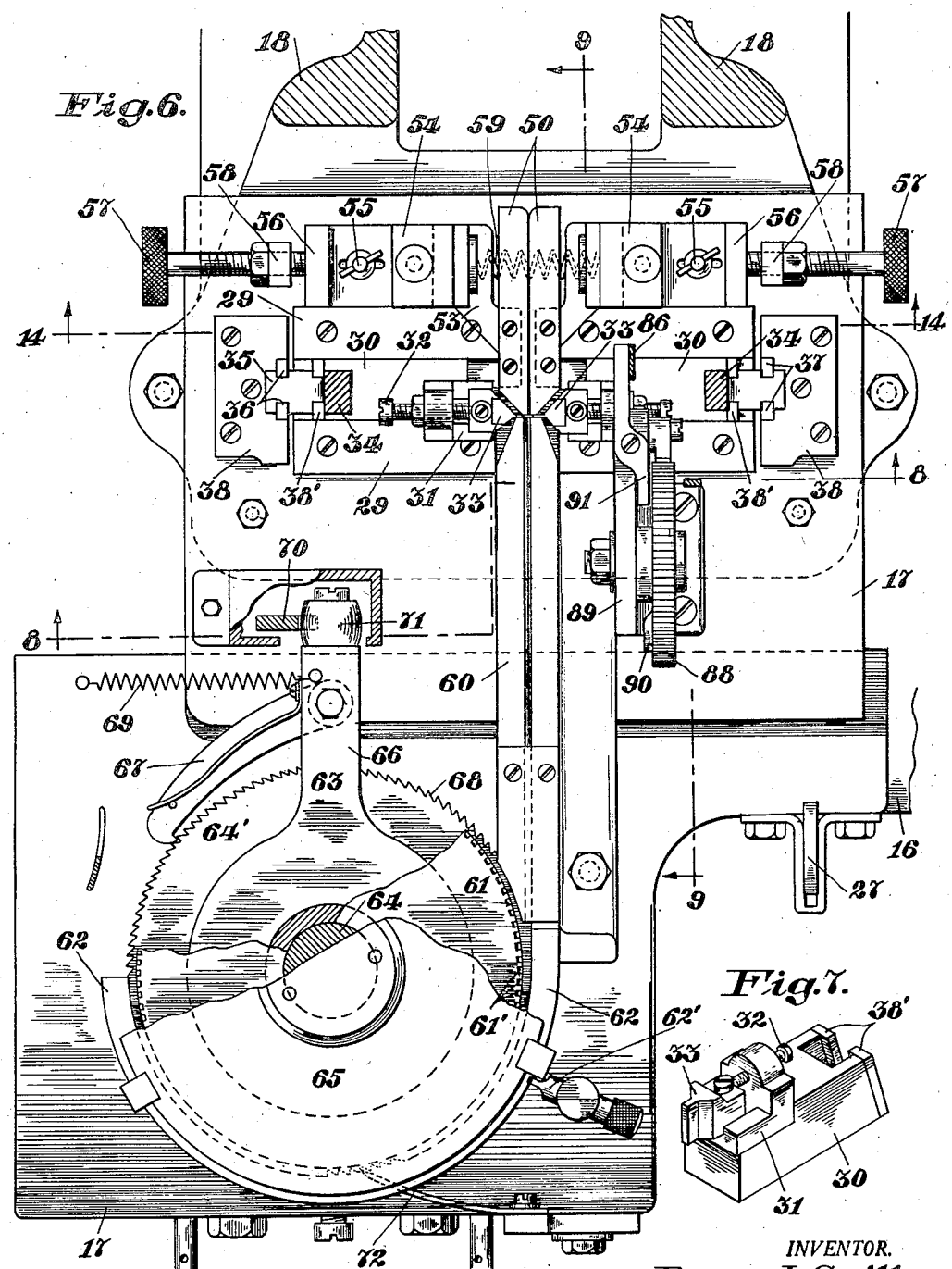

April 11, 1933.  R. J. SMITH  1,903,659
MACHINE AND METHOD FOR APPLYING FASTENER ELEMENTS
Filed Jan. 30, 1932  8 Sheets-Sheet 4
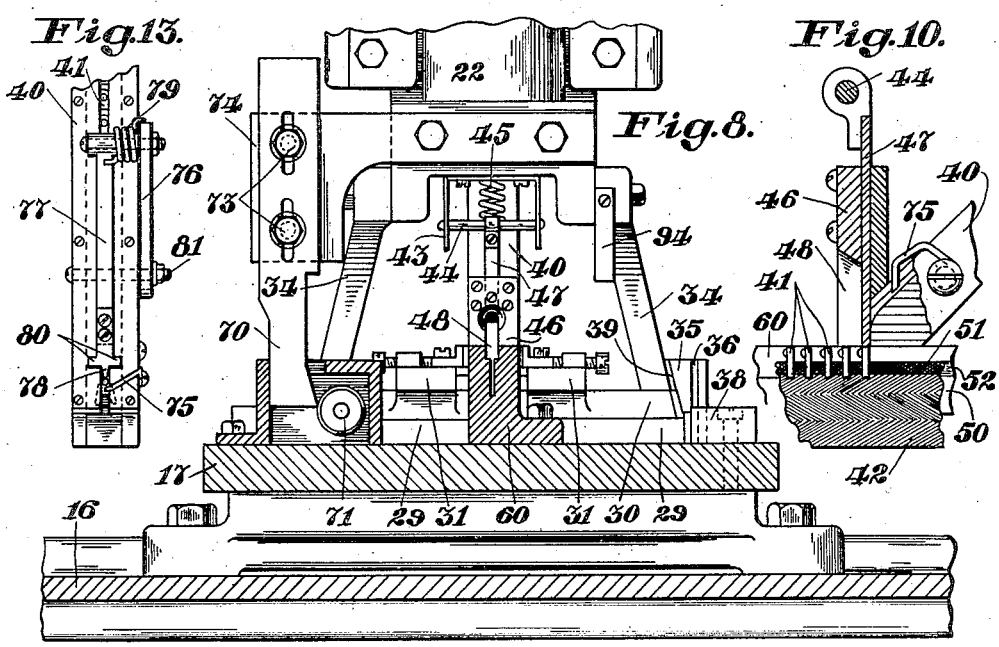
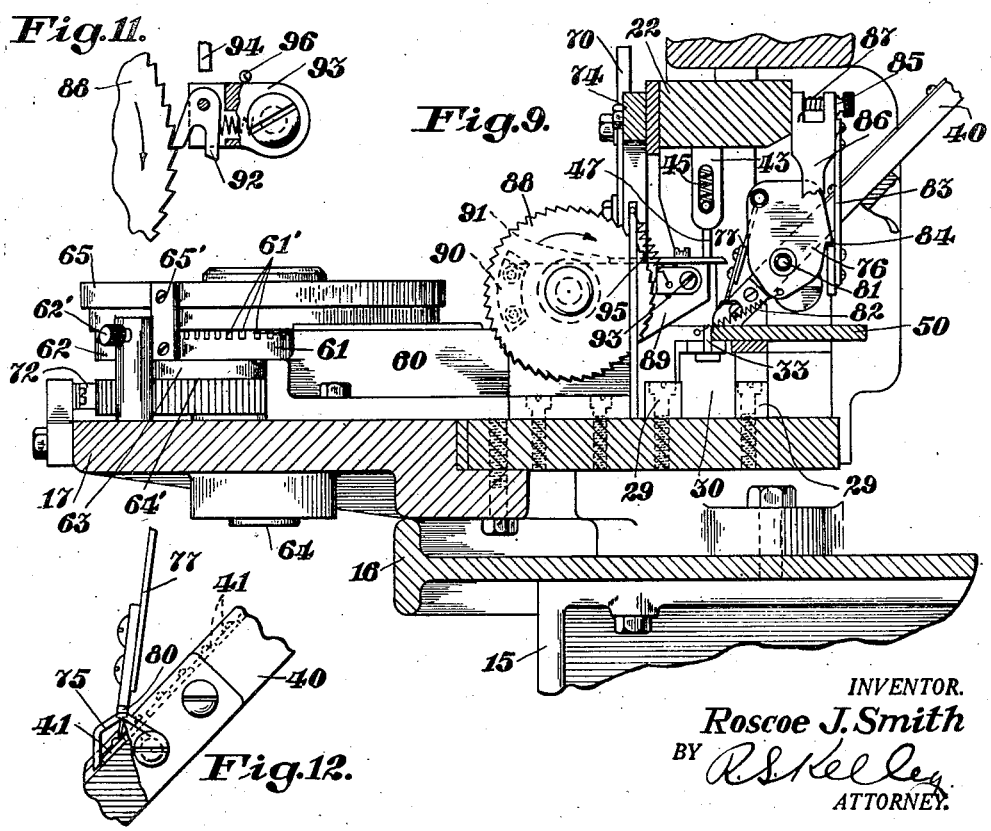
INVENTOR.
Roscoe J. Smith
BY
ATTORNEY.

April 11, 1933.  R. J. SMITH  1,903,659
MACHINE AND METHOD FOR APPLYING FASTENER ELEMENTS
Filed Jan. 30, 1932    8 Sheets-Sheet 5

INVENTOR.
Roscoe J. Smith
BY
ATTORNEY.

April 11, 1933.    R. J. SMITH    1,903,659
MACHINE AND METHOD FOR APPLYING FASTENER ELEMENTS
Filed Jan. 30, 1932    8 Sheets-Sheet 6
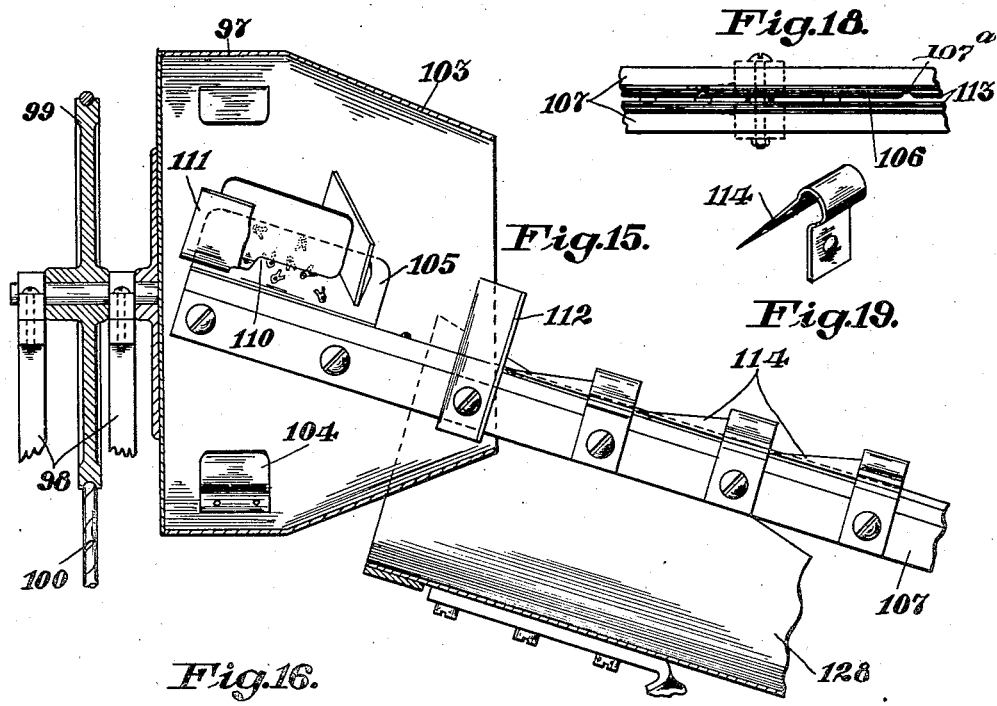
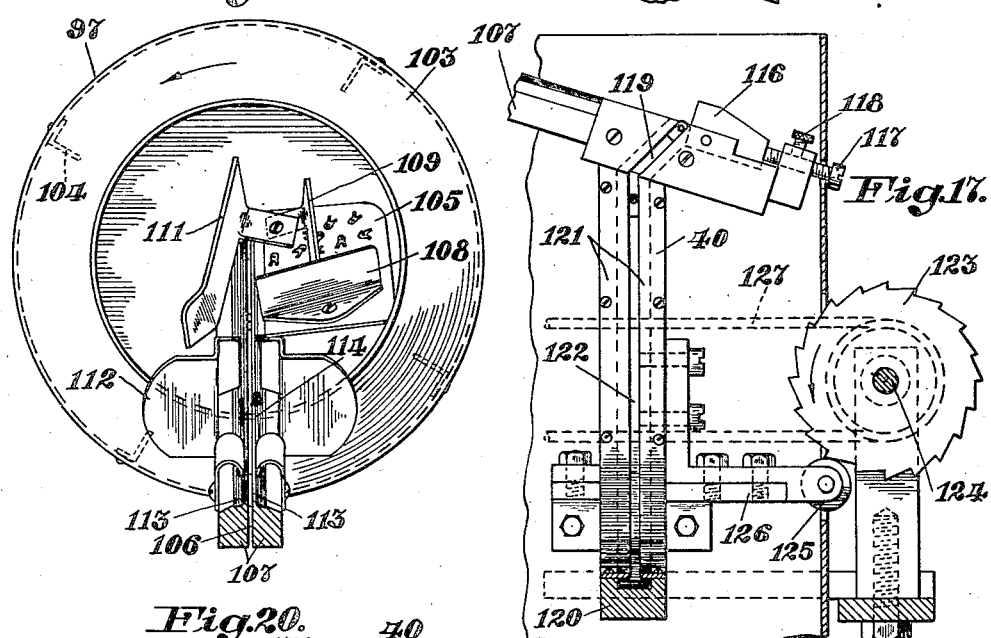
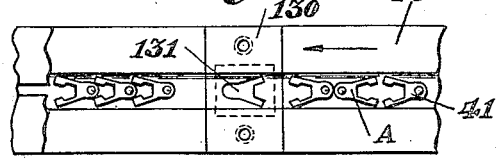
INVENTOR.
Roscoe J. Smith
BY
ATTORNEY.

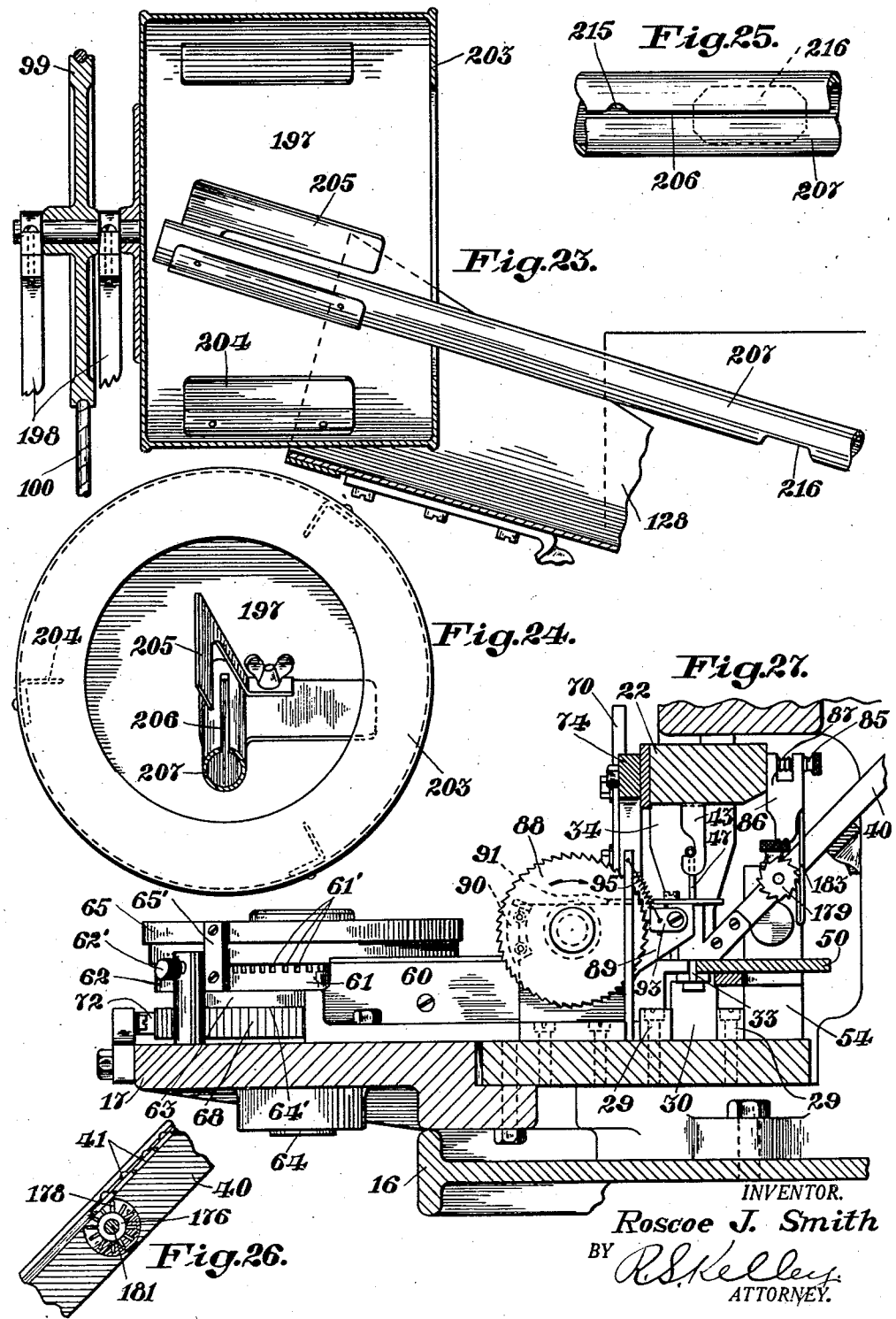

April 11, 1933.  R. J. SMITH  1,903,659
MACHINE AND METHOD FOR APPLYING FASTENER ELEMENTS
Filed Jan. 30, 1932  8 Sheets-Sheet 8
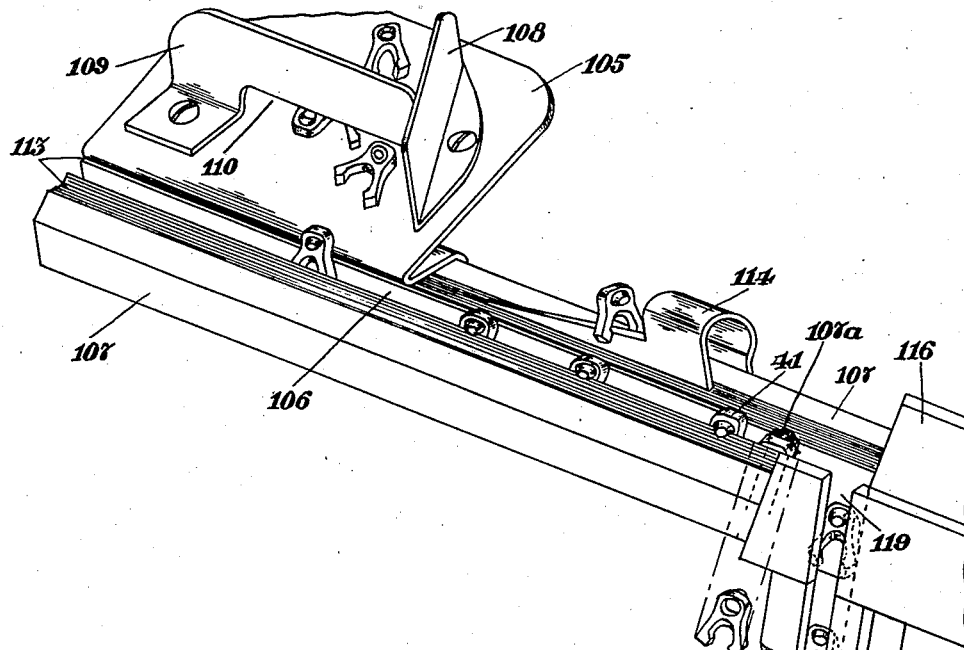
Fig.28.
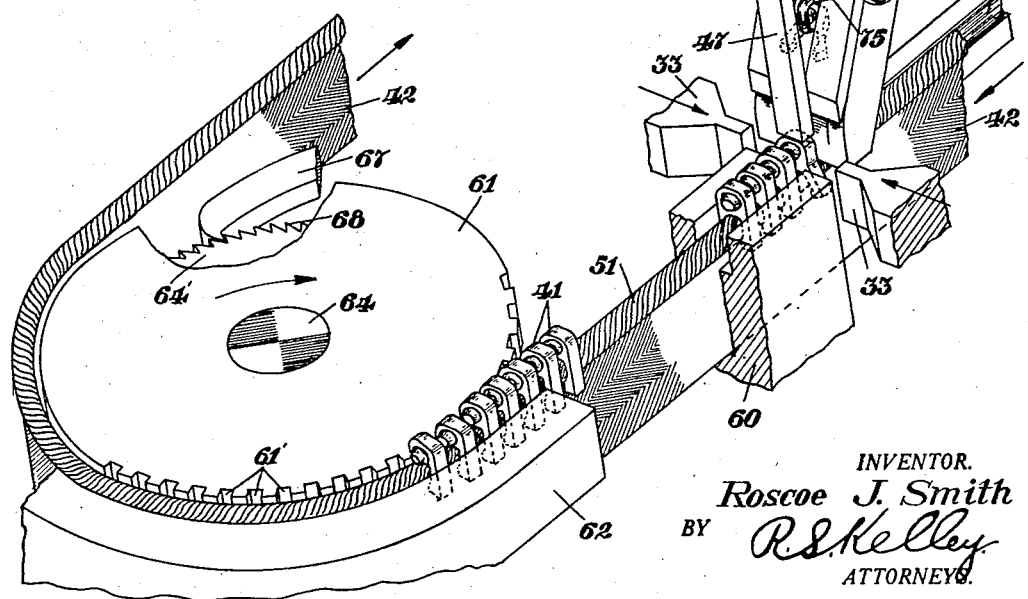
INVENTOR.
Roscoe J. Smith
BY R. S. Kelley
ATTORNEYS.

Patented Apr. 11, 1933

1,903,659

UNITED STATES PATENT OFFICE

ROSCOE J. SMITH, OF GLEN RIDGE, NEW JERSEY, ASSIGNOR TO HOOKLESS FASTENER COMPANY, A CORPORATION OF PENNSYLVANIA

MACHINE AND METHOD FOR APPLYING FASTENER ELEMENTS

Application filed January 30, 1932, Serial No. 589,918, and in Great Britain August 10, 1931.

This invention relates to a machine and method for applying fastener elements and aims to provide an improved device of this character specifically intended for use in the arranging, feeding and applying of, for example, fastening elements to a mounting member.

This application is in part a continuation of my co-pending application Serial No. 245,417, filed January 9, 1928, abandoned December 18, 1932.

The invention further contemplates an improved method of manipulating such fastening elements including taking elements from a mass, arranging and feeding them preparatory to their application to a mounting member.

The fastening elements to which my invention is particularly applicable are the interlocking units of what is commonly known as a slide fastener. As well known in the art, such a fastener comprises two mounting members or stringers, each having properly shaped fastening elements attached rigidly thereto in uniformly spaced relation. Such fastening elements may have the form of a generally flat body with diverging arms constituting spaced apart jaws at one end and an interlocking projection and recess on opposite sides of the element at its other end. In the application of the elements to the mounting members they must be firmly attached and accurately spaced apart.

It is an object of the invention to construct a machine of this type by means of which defective work will be avoided.

In other known machines and methods of manufacture of such elements, after being formed they are not released but are held in position until attached to the mounting member. This does not afford the opportunity for tumbling and plating operations which are essential to form a smooth and highly finished fastener. My improved machine and method will permit of any desired amount of tumbling, as well as the plating of the elements, if desired, after they have been completely formed and prior to their application to the mounting member.

A further object of the invention is that of providing an applying machine which will operate at high speeds to produce a relatively large amount of perfect product within a given time.

A still further object is that of furnishing such a machine, the parts of which will be relatively few in number and individually simple and rugged in construction, these parts being assembled to provide a machine operating over long periods of time with freedom from mechanical difficulty.

With these and further objects in mind, reference is had to the attached sheets of drawings illustrating one embodiment of the invention, and in which:

Fig. 2 is a front view thereof;

Figs. 3, 4 and 5 show details of the fasteners which are mounted by means of the present machine;

Fig. 6 is a partly sectional plan view of the machine bed;

Fig. 7 is a perspective view of one of the clamping assemblies shown in the preceding figure:

Fig. 8 is a transverse sectional view taken along the lines 8—8 of Fig. 6;

Fig. 9 is a sectional side view taken along the lines 9—9 of Fig. 6;

Fig. 10 is an enlarged sectional side view of the parts adjacent the applying station of the machine;

Fig. 11 is a fragmentary enlarged sectional view of a detail of the feed control mechanism;

Fig. 12 is a similar view of a portion of the chute and element feeding mechanism disposed in advance of the applying station of the machine;

Fig. 13 is also a fragmentary view of the lower portion of the chute and element feeding mechanism looking in a direction at right angles to Fig. 12.

Fig. 15 is a partly sectional side view of the hopper which preferably forms a part of the present construction;

Fig. 16 is an end view thereof;

Fig. 17 shows the vibrating mechanism employed:

Fig. 18 is a detail of a portion of the feed tube for the fastening elements;

Fig. 19 is a detail view showing one of the control fingers;

Fig. 20 is a plan view of a portion of the chute, the cover portions of such chute being removed to disclose the underlying constructions;

Fig. 23 is a sectional view corresponding to Fig. 15 showing a varied form of the construction of the hopper in accordance with the disclosure of my earlier filed application mentioned above;

Fig. 24 is an end view of the hopper shown in Fig. 23 corresponding to Fig. 16;

Fig. 25 is a detail view of a portion of the feed tube for fastening elements of the hopper construction shown in Fig. 23;

Fig. 26 is a fragmentary view of a part of the chute and element feeding mechanism corresponding to Fig. 12, but showing variations in form; and Fig. 27 is a sectional side view corresponding to Fig. 9 showing a modified construction.

Fig. 28 is a schematic view illustrating portions of the machine which operate on the fastener elements.

Figure 1:
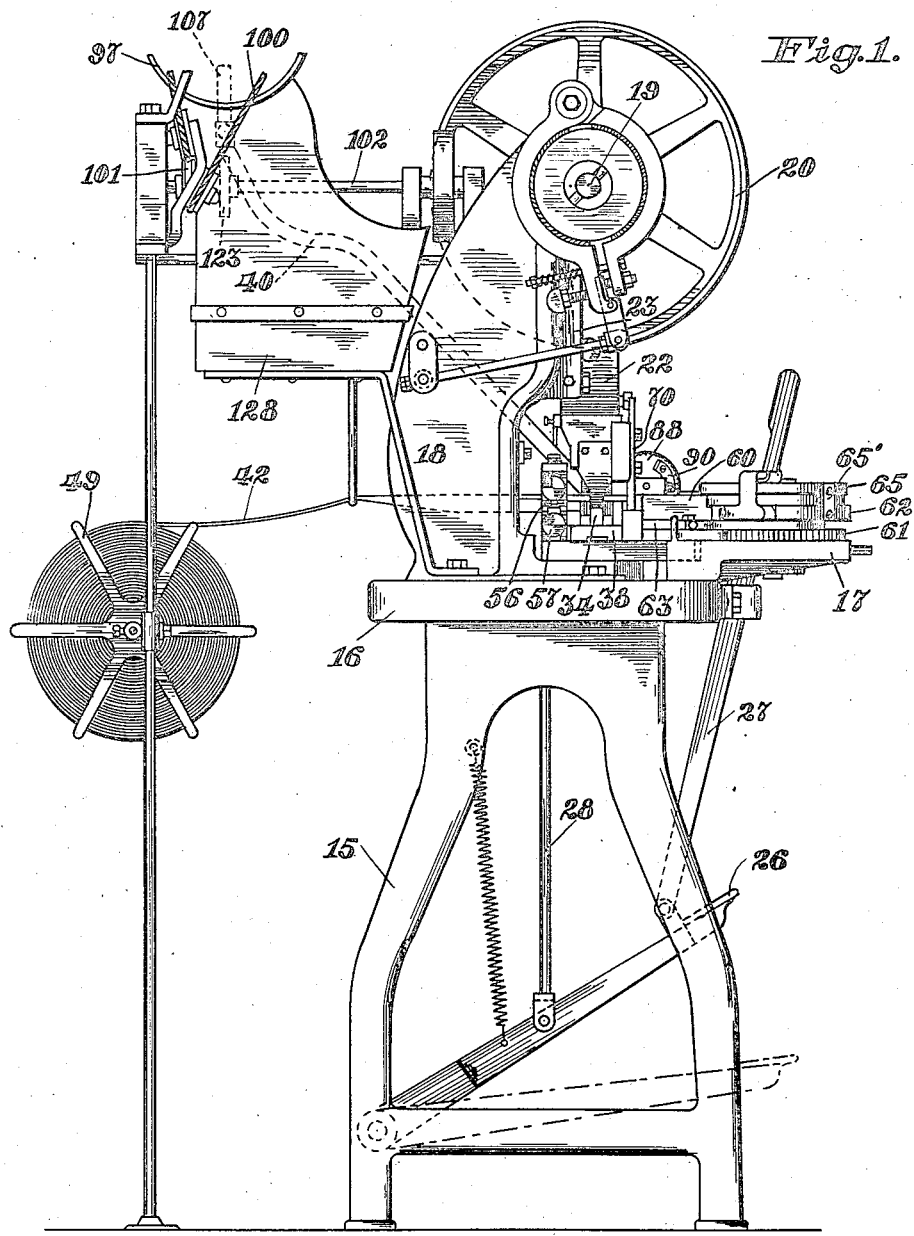
Figure 1 is a side elevation of a machine embracing one form of the present invention.

It will facilitate understanding of the machine illustrated, to refer briefly to the schematic view in Fig. 28. A mass of fastener elements is delivered constantly to the shelf 105 and large numbers of them pass over the slot 106 in the upper portion of the chute. A small percentage of the elements passing over the chute will fall into the slot in the positions illustrated. Those that are caught by the chute sideways will be lifted off by the fingers 114. Those that are caught by the chute with the small interlocking projections on one side of the chute will be eliminated by dropping out through the notch 107a alongside the slot. Those that remain will pass into the lower portion of the chute with their jaw ends traveling foremost and will press against the spring finger 75. From this position they are delivered one by one by the feed finger 77 and reciprocating plunger 47 into proper position with the jaws astride the edge of the tape 42. At this point clamping tools 33 come in from the sides and press the jaws together on the tape. When the clamping tools and plunger 47 retract, the tape is fed forward by means of the feed disk 61 operated by a ratchet and pawl device 67, 68, whereupon the blank portion of the tape is presented in proper position to receive another fastener element.

The numeral 15 indicates the machine base which terminates in a supporting surface 16 mounting a deck member 17 and a head 18, the latter serving to support, rotatably, a shaft 19 to one end of which a driving wheel 20 is secured. This shaft has a crank portion to which a pitman 21 is rockingly connected, the opposite end of this pitman being secured to a head 22 mounted for reciprocation in tracks or guideways 23 associated with the head support.

With a view to furnishing a suitable control for the operation of the machine, a clutch part 24 may be secured to the drive wheel or pulley and this part may be clutched with another part 25 by actuating a treadle 26 or lever 27, both associated with the machine base and connected as, for example, by a rod 28, to the clutch parts. Associated with the machine bed 17 are a pair of aligned track portions 29, which according to the present exemplification are disposed one to each side of the center of the machine, and within which there are slidably mounted blocks 30. Secured to each of the blocks 30, as for example, by a lug 31 and an adjusting screw 32, is a clamping head or jaw 33. In order to reciprocate the blocks 30 a pair of angularly extending arms 34 are secured one to each of the side faces of the head 22. These arms carry, at their lower ends, guide members 35 which have their side faces grooved, as at 36, to receive the projecting portions 37 of mounting blocks 38, the latter being attached to the bed 17. Thus, as the head 22 reciprocates, the arms 34 will move in a similar manner, the outer ends thereof being guided to prevent undue strain at these points. Each of the projecting blocks 30 is formed with a recess in its rear edge and with tongue or projecting portions 38' to the rear of this recess, this structure serving partially to enclose, in each instance the arm 34, and each block 35 has further slots 39 in its side faces for the accommodation of the projecting portions or tongues 38'. As a consequence, when the arms move incident to the movement of the head, the projecting blocks 30 will not only be moved simultaneously towards each other, but will also move outwardly in opposite directions as the head ascends.

The lower portion of chute 40 extends downwardly to a point underlying the head 22 and slightly in advance of the clamping heads 33. The structure of this chute will be hereinafter more particularly described, but at this time it will be understood that it serves as a guide for fastening elements 41 which are to be applied to a carrier such as a mounting member 42. The lower portion of the chute is always filled with fastener elements and thus functions as a reservoir or holding means for fastener elements. Secured to he head 22 are a pair of I-shaped members 43 which serve to support a bar 44. This bar is acted upon, preferably, by a compression spring 45, placed between the head and the bar. A guide block 46 is attached to the bed plate 17 and this block is formed with a slot or recess for the mounting of a plunger rod 47 and is further formed with a transversely extending opening 48 intersecting the path of travel of the end of the rod 47, the plane of reciprocation of the rod end being slightly beyond the delivery end of the chute 40, as shown in Fig. 10.

A reel 49 carrying a reserve of mounting strip 42 may be supported adjacent the machine and this strip is guided to extend in a vertical plane between plates 50, which are spaced to an extent sufficient to permit the passage of the mounting member, and which, if the mounting member be in the nature of a tape having a beaded upper edge such as 51, are formed with aligned and opposed recesses 52 for the accommodation of this bead. These plates or tracks are mounted, one upon each of extensions 53, which are adjustably secured and guided with respect to brackets 54 by means of a lug, slot and clamping bolt structure, such as has been shown at 53′, 54′ and 55′ respectively. Each of the extensions may be partially adjusted by a set screw 56′. The brackets 54 are held normally immovable with respect to the bed of the machine by means of bolt and slot connections 55. These brackets, together with the track members carried thereby, may be adjusted, however, upon the aforesaid connection being loosened by, for example, employing screw threaded bolts 57, the shanks of which extend through threaded blocks or lugs 58 and bear against the rear portions 56 of the brackets. The adjustment may be achieved by simply rotating the knurled heads of these bolts until the plates or track members are in proper relative position and bear against the tape with the proper degree of intimacy. Thereupon, by tightening the connections 55 and 55′ the brackets will be held immovable. In this connection it will be observed that a spring 59 is preferably interposed between the inner ends of the brackets so that, upon the parts being loosened the plate or track members 50 will tend to spring apart. The mounting member, which will hereinafter, consistent with the specific embodiment of the invention, be referred to as a tape, passes from between the plates 50 to a guide 60, which is positioned beyond the clamping blocks or jaws 33 and is spaced from the plates 50 which, as shown, terminate in a plane short of these blocks.

Thus as fastener elements 41 move down the chute 40 they will drop to have their arms straddle the tape, this action being assured by the rod 47, which will force them into such position, whereupon, with the parts properly timed, the clamping dies or jaws 33 will bend the arms or legs of the fastening elements so as to engage intimately the mounting member and specifically the bead 51 thereof to prevent any possibility of subsequent and accidental detachment. It is to be observed in this connection that as a consequence of the mounting of the rod 47 it will, upon each upward movement of the head 22, also move in a similar direction as the eyes 43 engage the bar 44 to lift the same and the rod against the compression of the spring 45 and upon each downward movement of the head, the rod will strike against a fastener element which has been delivered at the end of the chute and press against the same during the continued downward movement of the head incident to what might be termed the lost motion connection existing between the bar and eyes. Thus, each fastening element will be maintained in position upon the tape while the clamping blocks 33 move inwardly to secure the same, and only after this securing has been effected will the rod disengage from the fastening element.

Now considering the structure by means of which the tape is fed through the machine, it will be observed that, by means of a shaft 64 a plate 61 is mounted rotatably upon the bed of the machine and conveniently has its periphery extending in line with the slot of the guide or track member 60. Positioned adjacent the plate 61 is an arcuate member 62 which, in conjunction with the periphery of the plate forms a continuation of the track or guide member 60. The member 62 is retained in such position, preferably, by the use of a plate 65 which is supported upon the shaft 64 and is secured to the arcuate member as, for example, by strips 65′. In order normally to prevent a shifting of the member 62 with respect to the plate 61 a releasable lock element 62′ may be employed, it being obvious that while the parts are normally retained in the position shown that, by releasing this locking device the member 62 may be shifted to uncover portions of the periphery of the plate 61, the purpose of this construction being hereinafter brought out. In the embodiment illustrated the periphery of the plate is formed with an annular series of notches or recesses 61′ of sufficient dimensions to each accommodate a portion of one of the fastening elements and these recesses being spaced to an extent equal to the spacing of the fastening elements upon the tape. It will be apparent that the plate 65 will protect the parts to prevent the entrance of foreign matter and will also guard against injury to the fingers of the operator. Disposed below and spaced from the plate 61 is a disk 64′ which may be rigidly secured to, or form an integral part of the plate 61. Interposed between this disk and plate is a member 63 mounted to oscillate on the shaft 64 and having an arm or extension 66 mounting a spring-pressed pawl, 67. The pawl cooperates with an annular series of ratchet teeth 68 formed in the periphery of the disk 64' and a spring 69 may be utilized in order normally to shift the arm 66 and pawl 67 towards the left, as viewed in Figure 6, it being obvious that the pawl and ratchet structure will, during such movement, have lost motion. In order to shift the parts in an opposite direction, in which it will be obvious that a rotation of the disk 64' and the plate 61 will follow, a bar 70 is provided which has, at its lower end, a cam portion cooperating with a roller 71 at the outer end of the arm 66, it being obvious that as the bar 70 is moved downwardly, the pawl and ratchet structure will have lost motion, during which any tendency of the disk, together with the plate, to move (in the embodiment illustrated) in a counter clockwise direction, will be prevented by a pawl 72 of the static type. As, however, the bar 70 moves upwardly and the cam portion thereof cooperates with the arm 66 to swing the same in a clockwise direction, the disk and plate will be positively shifted. In order to effect such operation of the bar the latter is attached adjustably, as at 73, to a bracket 74, in turn secured to the head 22 of the machine, it being apparent that, by means of this adjustment, the parts may be accurately and properly timed and that, as the head reciprocates, the plate 61 will be shifted; also, due to the fact that this plate operatively engages the mounting strip, as well as the fastening elements, the latter will also be shifted during the up-stroke of the machine head, but will remain stationary as the head and its associated parts move downwardly.

Now referring to the mechanism controlling the feed of the fastening elements 41 from the latter portion of the chute 40 to the applying station, it will be observed in Figs. 9 to 13 inclusive that a spring retaining finger 75 is mounted on the chute. The end of the spring finger extends into the path of the central projections on the fastener elements thus holding the column of elements against movement. A feed finger 77 has a pointed end 78 which is adapted to reciprocate in a short path along the chute, and during such reciprocation, the pointed end 78 of the feed finger engages behind the endmost element, being supported by the retaining finger 75, and pushes it against the tension of the spring finger into a position where it can be quickly engaged by the plunger 47. The feed finger 77 is mounted on a plate or bell crank lever 76 and is normally pressed against the chute by a coiled spring 79. The end of the finger is formed with lugs 80 which slide along the outer surface of the chute. The plate 76 is pivoted at 81 and is normally held in position to retract the feed finger by a tension spring 82. If the plate 76 is oscillated intermittently with a rapid movement it will follow that the feed finger will quickly release the fastener elements in succession from the spring finger 75 and impel them into the lower end of the chute where they will be engaged by the pusher 47.

In order to effect such oscillation of the plate 76, there is provided for example, a latch or pawl 83 which is of spring material in order that it may override and engage in the notch 84 in the plate 76 during the downward stroke of the head. The latch or pawl 83 is mounted upon a shaft 85 carried by the reciprocating head and is adapted to be swung out of engagement with the notch 84 by means of a downwardly depending arm 86 normally held by a coil spring 87 inwardly so as to permit the pawl 83 to engage in the notch 84. If the arm 86 is moved outwardly, however, the pawl will be disengaged from the notch, which is of value to interrupt the feed of the fastener elements periodically in that, as a consequence, the feed finger 76 will not be reciprocating under the circumstances. In order to effect periodically such an actuation of the arm 85, a ratchet member 88 is rotatably mounted upon a plate 89 secured to the bed of the machine, this ratchet wheel having a cam portion 90 which may engage with one arm of a lever 91 pivotally mounted on the plate 89 and having its opposite arm lying adjacent the arm 85 in order, when the cam strikes against the outermost arm of this lever, to swing the pawl 83 outwardly and interrupt the feeding of the fastening elements.

The ratchet 88 is rotated by a spring-pressed pawl 92 carried by a pivotal detent 93, the latter being attached to the plate 89. A rod 94 is secured to reciprocate with the machine head and moves in a plane at which it will strike against the upper edge of the detent 93. The position of the latter is maintained by a post, to the upper end of which a spring 95 is attached, the lower end of this spring being secured to the detent 93. A stop pin 96 is secured to the plate 89 and disposed adjacent the upper edge of the detent. Thus, this latter element is normally retained in the position shown in Figures 9 and 11 and may not move beyond such position due to the stop pin. However, as the head moves downwardly the bar 94 strikes against the detent 93 to move the same and the pawl 92 a distance corresponding to one tooth of the ratchet 88. Consequently there will be imparted to the ratchet a step by step movement which will result, periodically, in the cam 90 engaging the outer end of the lever 91 to shift the pawl 83 to inoperative position, to thus interrupt the feed of the fastener elements.

Reviewing, briefly, the foregoing it will be understood that with the drive pulley 20 clutched to rotate the shaft 19, the head 22 will, by means of the pitman 21, be reciprocated. The tape, or other mounting member, will be fed from the reel 49 and will pass through the machine by virtue of its engagement with the plate 61 and may pass, thence, to any desired mechanism or storage provision (not shown). The fastening elements will be moved downwardly within the chute 40 in a manner hereinafter described, and if an impelling mechanism is employed these fastening elements will be virtually thrown to the applying station in such position that they straddle the tape. It is to be understood that if this impelling mechanism takes the form illustrated, it will serve, also, as a control for the spacing of the fastening elements in that the parts are timed so that the tape is stationary during the delivery of a fastening element to the applying station and the application of such element to the body and only after the fastening element has been mounted securely does the tape again move. In any event, the movement of the tape may, as shown, be controlled by the cam provided by the bar 70; the pressing of the fastening elements on to the mounting member and the retention thereof during the anchoring of these members to each other being assured by the rod 47, and clamping being achieved by the jaws 33. Periodically, due to the shifting of the pawl 83, no fastening elements are applied to the mounting member, so that these elements appear upon the tape in groups spaced from each other. This, as afore brought out, may be achieved by the control mechanism including the cam 90, lever 91, and actuating arm 86.

Now referring to the mechanism preferably employed for transferring fastener elements from a loose mass in orderly arrangement to the delivery end of the chute 40, it will be observed that a barrel, or tumbler 97, is rotatably mounted upon standards 98. This tumbler may be driven by a pulley 99 and cable 100, the latter passing around a pulley 101 secured to a shaft 102, which latter has driving connection with the wheel 20. The rear wall of the tumbler 97 is imperforate and the forward wall thereof may have an inwardly extending flange 103. This drum is filled with fastening elements to a certain level and rotates at a comparatively low speed and in the direction of the arrow indicated in Figure 16, as a consequence of which the fastening elements under the influence of baffles 104 move upwardly and drop on to a fixed guide shelf 105, which is inclined toward the slot 106 of the inclined upper end of chute 40 formed by parallel bars 107. A guide wall or bracket 108 is mounted on the shelf 105 and a plate 109 cut away at the bottom to provide a gate 110 is arranged adjacent the upper end of the chute in order to control the flow of the fastener elements along the guide shelf toward the slot. The gate 110 is only high enough to allow a thin layer of fastener elements to pass, which will effectively prevent jamming of the elements at the point of entering the slot. A deflector plate 111 may also be mounted opposite the slot and in substantial alignment therewith to deflect any falling elements in its locality toward the slot 106. The guide shelf and plates 108, 109 and 111 are conveniently supported by screws or bolts upon the end of the bars 107. There may also be provided suitable means for preventing elements from escaping from the hopper such as the wing plates 112 attached to the bars 107.

The majority of the fastening elements which pass over the slots 106 will pass by and drop back into the base of the hopper or drum. Many of them, however, will come to the slot in such a position that the arms or jaws will extend into the slot 106 between the bars 107, and due to the fact that this slot is only wide enough to permit entrance of the jaws but precludes passage of the projection end of the element, the projections will lodge on one or the other of the bars 107 and due to the inclination of these bars, the elements will gravitate downwardly along the bar. In order to assist the movement of the elements along the edges of the bar such edges are made very thin as indicated at 113 and preferably the bars are made of high carbon steel so that such edges can be hardened, ground and polished to minimize friction. In addition, the whole structure is vibrated as will be later described. Some of the elements will catch in the slot with only one of the arms or jaws engaging therein, the other arm hanging over the edge of the bar. It is desirous to remove such improperly spaced elements and this is accomplished by pointed fingers 114 attached to and extending along the edges of the bars closely adjacent and substantially parallel to the slots 106. These pointed fingers 114 will engage the overhanging jaws and lift the elements so engaged out of the slot and allow them to drop back into the drum 97. Preferably a series of such fingers are provided so that such improperly placed elements as are not caught by the first fingers will be removed by succeeding fingers.

With the arrangement which has been described, it will be noted that part of the elements will be riding with their projections hanging on the edge of one bar while others will be riding with their projections hanging on the edge of the other bar. It is desirable to select only those elements which have their projections extending in one direction and to accomplish this purpose, the edges of one of the bars 107 are provided with a plurality of notches 107a so that all of the elements supported by the bar having the notches will be dropped out when the projection engages one or the other of the notches, and such elements as are dropped out are returned to the drum.

At the lower end of the parallel bars 107 is mounted a buffer block 116 which is adjustable by means of screws 117 and 118 to the desired positions. The fastening elements upon reaching the lower end of the slot 106 strike this stop buffer block and are diverted into the inclined chute portion 119 to extend with their head portions uppermost and their arms downwardly. From this inclined portion they will move into the lower portion of chute 40 which as will be noted, specifically includes a base or supporting bar 120 and cover plates 121 spaced apart to leave a slot 122 between them in which the projection of the element rides and serves to center the element.

In order to assure rapid movement of the fastening elements, the chute is mounted to permit vibration, which is preferably accomplished by employing a ratchet 123 secured to shaft 124 and cooperating with a roller 125 which is spring pressed into engagement with the teeth of the ratchet and which is attached to a bracket 126 mounting the chute 40. The ratchet 123 may be rotated from any suitable source of power through the belt 127. The amplitude of vibration is small and the frequency is preferably very high. It has been found in actual use that a vibration of 7,000 to 10,000 vibrations per minute is most suitable although satisfactory results might be obtained with vibration frequencies ranging from 5,000 to 15,000 per minute.

It might be mentioned at this point that in the embodiments illustrated the elements which escape from the mouth of the drum 97 or which fall from the chute outside the drum are caught by a suitable pan 128 from which they may be returned to the drum. Automatic means, of course, could be easily arranged for returning the elements, if desired.

Figures 21, 22:
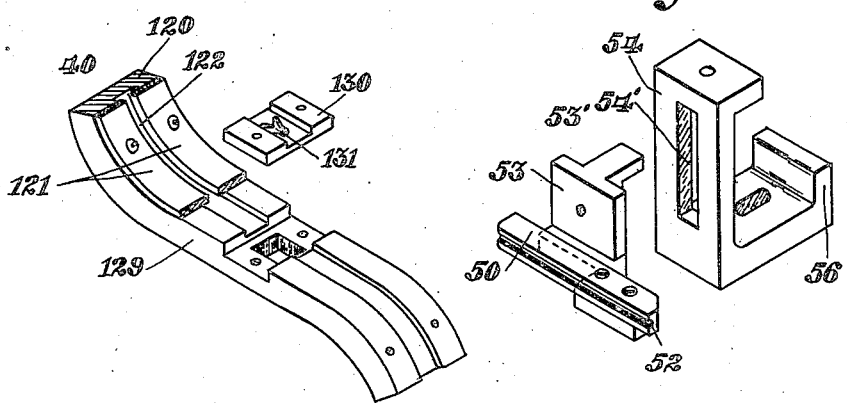
Fig. 21 is a perspective view of the parts shown in Fig. 20.
Fig. 22 is a similar view showing the track assembly in advance of the applying station of the machine.

It is possible that the elements will jam against the stop 116 and there is a chance that some of the elements will be turned so that their head end goes down in advance of the jaw end. This will be contrary to proper feeding because normally the legs or jaws should precede the head portion and in order to avoid any difficulties in this respect, it will be observed as in Figs. 20 and 21 that there is set into a nearly horizontal portion 129 of the chute, a block 130 having an aperture 131, the outline of which corresponds to and is slightly larger than the fastening element with its head portion foremost as indicated at "A" in Fig. 20. Such elements will therefore necessarily drop through the opening 131 into the pan 128. The purpose of the relatively horizontal portion 129 will be apparent in that the fastening elements at this point will be moved at a relatively slow rate of speed and consequently any one of the same which enters the chute improperly will be discarded. Additionally, it will be understood that due to the horizontal portion a mass of fastening elements will not bear with their aggregate weight against the feed mechanism. Furthermore, this portion will serve as what might be termed a buffer-reservoir for the fastening elements and assure a sufficient reserve thereof, even although minor interruptions in feed should occur at points in the chute and tube in advance of the same.

In operation, it will be appreciated that a number of fastening elements are disposed within the hopper. These fastening elements are suitably sorted prior to their introduction into this receptacle so that only perfect ones are used. With the hopper properly filled and the shaft 19 rotating, this hopper will likewise be rotated, so that fastening elements will, in the manner afore described, pass along the chute under the influence of the vibrating mechanism, it being understood that, as afore brought out, fastening elements which are improperly disposed within chute, will be automatically eliminated. An operator will now draw the forward end of the mounting member, i. e. the tape 42, between the tracks or plates 50 and past the applying station. If the clutch 24, 25 is actuated, at this time, a number of fastening elements will be applied to the mounting member and thereupon the end of the latter may be drawn along the track 60 and the tape pressed into contact with the periphery of the plate 51 and in such manner that the initial fastening elements are disposed one within each of the recesses 61'. This is achieved by withdrawing the lock member 62' and swinging the plate 65 together with the arcuate member 62 to a point at which the periphery of the plate 61 is exposed. Thereupon, the member 62 is returned to its normal position (i. e., that shown in Figure 6) and is secured.

The machine is now ready for operation, it being understood that a sufficient supply of fastening elements has, in the interim, moved into the chute to assure an adequate operating reserve. In this connection it will be observed that if the chute assemblage is filled to capacity, no damage may occur to the parts incident the continued rotation of the hopper, as all of the fastening elements which strike against the plate 105 will simply be diverted into the hopper base. If, now, the clutch parts 24—25 are engaged, it will be apparent that upon the upward movement of the head 22 the plate 61 will be shifted a distance equal to the space between two fastening elements. Simultaneously a fastening element will be impelled through the lower end of the chute by means of the mechanism shown particularly in Figures 12 and 13 and will come to rest with its legs straddling the tape after the latter ceases to move. Thereupon the rod 47 will press the fastening element into proper engagement with the tape, this occurring during the downward movement of the head. Subsequently and during the continuation of such downward movement, the applying jaws or clamping elements 33 will move inwardly to press the arms or legs of the fastening elements into contact with the side faces of the tape. The head will then ascend, resulting in a releasing of the fastening element from engagement with the clamping members and a withdrawal of the rod 47 from contact therewith. Thereupon the tape will be fed forward by means of the plate 61 a distance equal to the spacing of one fastening element, these operations being continued so long as the clutch parts are engaged and subject only to the interruption of feed of the fastening elements by the shifting of the pawl 83. Such shifting, as afore brought out, is controlled by the cam 90 and ratchet 88, which latter is moved each time that the head moves.

Figure 14:
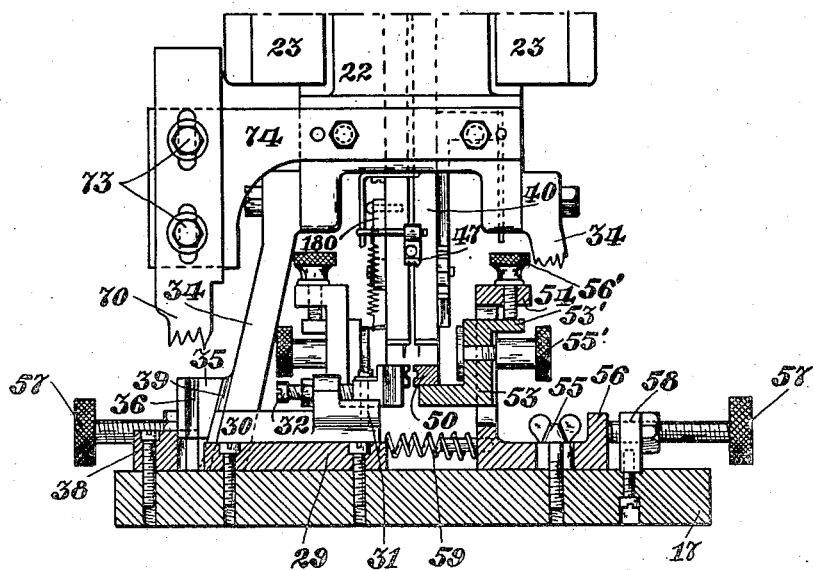
Fig. 14 is a sectional view taken along the lines 14—14 in the direction of the arrows of Fig. 6.

In the alternative embodiment of certain devices illustrated in Figs. 26 and 27 the mechanism for controlling the feed of the fastening elements 41 from the lower portion of the chute 40 to the applying station, it will be observed that a sprocket or star wheel 176 is mounted to have its arms 178 extend into the chute in order to engage with the bodies of the fastening elements. This wheel is mounted upon a shaft 181 having at one end a ratchet 179 and at its opposite end a friction brake 180 (see Fig. 14). If the wheel is held stationary no fastening element will move down the chute 40 because the arms of the wheel extend into the path of travel of the fastener bodies. If, on the other hand, the wheel is rotated, these elements may move successively down the chute. Further, if the speed of rotation of the wheel is sufficiently great, it will actually impel the elements down the chute to the applying station. If now, the wheel is moved intermittently at comparatively great speed it will follow that the elements will be intermittently released and thrown down the chute to the applying station. In order to effect such an actuation of the wheel, a spring pawl 183 is mounted upon the shaft 85 and overrides the teeth of the ratchet 179 during the downward stroke of the head, the brake 180 holding the ratchet stationary during this movement. It will therefore be observed that the star wheel will move sufficiently to release one element for each reciprocation of the head. This spring pawl 183 is adapted to be thrown out of engagement periodically with this ratchet by mechanism similar to that described in connection with Fig. 9.

In Fig. 27, as an alternative construction, there are also shown a plurality of hook elements 143 which may replace the eye members 43 such hooks having a lost motion connection with the bar 144 connected to the plunger 47.

In Figs. 23, 24 and 25 there is illustrated an alternative construction of the hopper and feeding arrangement which is simpler in construction. In this embodiment the drum 197 is rotatably mounted upon standards 198 and driven by a mechanism similar to that described in connection with Fig. 15. The forward wheel of the drum has a flange 203 leaving an opening into which may extend a tube 207 for conducting fastener elements from the drum. The drum is filled with fastening elements and rotates at a comparatively low speed, and as a consequence, the fastening elements under influence of baffles 204 move upwardly and drop against a fixed plate 205 which deflects the elements toward the slot 206 in the tube 207. The great majority of the fastening elements will fall against the plate in such a manner that they will drop back into the drum. Certain of them, however, will fall with their arms extending into the slot of the tube and will move downwardly therein. A notch 215 is formed in one wall of the slot in the tube and such elements as are not positioned properly, drop out into the tube and through the hole 216. The operation is substantially the same as described in the first embodiment.

Thus it will be apparent that perfect work will result in that only perfectly formed fastening elements are employed, which are fed in a proper manner to the tape, the spacing of these fastening elements—and the proper feeding of the tape being furthermore assured by the mechanisms provided for this purpose. As a consequence, the producer need have no fear of rejections incident to the quality of the work and it will be apparent that a machine embodying the present invention may be operated at high speed without danger of imperfect work resulting. By providing a method and apparatus for handling the fastening elements en masse and applying them to the tape, it is possible to tumble the fastening elements with suitable abrasive and polishing materials in tumbling barrels as long as desired and after being so tumbled and polished, they may, if desired, be plated with nickel, silver or gold, before being applied to the tape. Finally, if the feed control is employed, fastening elements will be arranged in convenient groups, one identical in number and spacing of the fastening elements to the other and these groups may be severed from each other so as to be conveniently marketable.

Thus, among others, the objects specifically aforementioned are achieved, but it is intended that numerous changes in structure and rearrangement of the parts might be resorted to without departing from the spirit of the invention as defined in the claims.

Having described my invention, what I claim as new and desire to secure by Letters Patent is:

1. A machine for permanently applying a series of fastening elements to a mounting member in the manufacture of slide fasteners including means for moving said mounting member, means for disposing fastening elements adjacent one edge of said mounting member and applying the same thereto, and means periodically interrupting the operation of such last named means whereby said fastening elements will be disposed in groups along one edge of said mounting member.

2. A machine for permanently applying a series of fastening elements along the edge of a mounting member in the manufacture of slide fasteners including means for moving said mounting member, a chute extending to a point adjacent said member and conducting fastening elements, means serving to control the feed of fastening elements through said chute and to impel the same into contact with said mounting member and means for securing said elements to said mounting member.

3. A machine for permanently applying a series of fastening elements along the edge of a mounting member in the manufacture of slide fasteners including horizontal supporting and guide means for said mounting member, means for disposing fastening elements in contact with said member, means for clamping said fastening elements to said mounting member and means associated with said supporting and guide means and cooperating with the mounting member to draw the same horizontally along said supporting and guide means.

4. A machine for permanently applying a series of fastening elements along the edge of a mounting member in the manufacture of slide fasteners including horizontal supporting and guide means for said mounting member, means for adjusting said supporting and guide means, means for disposing fastening elements in contact with said member, adjustable means for clamping said fastening elements to said mounting member and means associated with said supporting and guide means and cooperating with the mounting member to draw the same horizontally along said supporting and guide means.

5. A machine for applying fastening elements to a mounting member in the manufacture of slide fasteners including guide means for said mounting member, means for disposing fastening elements in contact with said member, means for clamping said fastening elements to said mounting member and means associated with said guide means and cooperating with the mounting member to draw the same along said guide means, said last named means being formed with a plurality of recesses to accommodate said fastening elements, said recesses being disposed with respect to each other to correspond to the disposition of the fastening elements upon said mounting member.

6. A machine for applying fastening elements to a mounting member in the manufacture of slide fasteners including a reciprocating head, a fastening element chute extending adjacent thereto, means for impelling a fastening element down said chute and into contact with a mounting member extending adjacent said head, means for feeding and guiding said mounting member, means connecting said head with said impelling means and with said feeding means to operate the same and means actuated periodically and controlled by the movement of said head to interrupt the operation of said impelling means.

7. A machine for permanently applying a series of fastening elements along the edge of a mounting member in the manufacture of slide fasteners including a chute for fastening elements, means for applying elements delivered through said chute to the edge of said mounting member, means for mechanically introducing fastening elements into said chute, means for eliminating, automatically, fastening elements disposed improperly within said chute and means for inducing movement of said fastening elements within said chute.

8. An applying machine for applying fasteners to a carrier including, in combination, a chute, fastener applying means located adjacent one of the ends of said chute, means for delivering fasteners into said chute, a ratchet means for vibrating the same, and a member extending from said chute and in contact with said ratchet whereby the entire chute will be vibrated to cause said fastener elements to be delivered to said applying means.

9. A machine of the character described including a chute presenting a slot, means for delivering fastening elements to ride with their bodies within said slot, and said fastening elements having portions bearing against the upper face of said chute, said slot being formed with a recess to permit a fastening element improperly disposed with respect to said chute to drop from supported relationship with respect thereto, means for delivering fastening elements to one end of said chute, and means for applying said fastening elements to a carrier at the opposite end of said chute.

10. A machine of the character described including a chute presenting a slot, means for delivering fastening elements to ride with their bodies within said slot, and said fastening elements having portions bearing against the upper face of said chute, said slot being formed with a recess to permit a fastening element improperly disposed with respect to said chute to drop from supported relationship with respect thereto, said chute being formed with an opening in its base for the passage of an unsupported fastening element, and said opening being located at a point beyond said recess, means for delivering fastening elements to one end of said chute, and means for applying said fastening elements to a carrier at the opposite end of said chute.

11. A machine of the character described including a chute presenting a slot, means for delivering fastening elements to ride with their bodies within said slot, and said fastening elements having portions bearing against the upper face of said chute, said slot being formed with a recess to permit a fastening element improperly disposed with respect to said chute to drop from supported relationship with respect thereto, means for delivering fastening elements to one end of said chute, means for applying said fastening elements to a carrier at the opposite end of said chute, said chute having its body disposed at an angle to the horizontal, and means for vibrating said chute to cause said fastening elements to gravitate throughout the length thereof.

12. A machine of the character described including a chute formed with a longitudinally extending slot, means for delivering the fastening elements to one end of said chute with their bodies extending into said slot, means whereby improperly faced elements move out of supporting engagement with said chute, means forming a part of said chute for changing the direction of travel of said fastening elements, and means for applying said fastening elements to a carrier.

13. An applying machine including a chute, means for delivering fastening elements to said chute and to extend with one of their side edges facing forwardly with respect to the same, means in said chute providing a transfer station for automatically shifting said fastening elements to travel with their end edges forwardly, and means for applying said fastening elements to a carrier.

14. An applying machine including a chute for receiving fastening elements including a pair of arms, means for delivering such elements to said chute, means for applying said elements to a carrier and extending adjacent said chute, and said chute being formed with an opening permitting of the passage of fastening elements extending improperly within said chute.

15. An applying machine including a chute, means for delivering fastening elements to one end of the same, said chute being inclined, means for vibrating said member to cause said fastening elements to traverse the length of the same, means for eliminating automatically improperly faced fastening elements, and means for applying to a carrier fastening elements delivered by said chute.

16. An applying machine including a chute presenting a slot to accommodate the legs of fastening elements having head portions, said slot being formed with a recess in one of its edges to permit of the passage of the head portions of improperly faced fastening elements, means causing said fastening elements to rest against the base of said chute, the latter being formed with an opening for the passage of fastening elements traveling through said chute with their wrong ends foremost, and means for applying said fastening elements to a mounting member upon their emergence from said chute.

17. An applying machine including, in combination, means presenting a track for a mounting member, means for applying fastening elements to said mounting member, a disk to engage said mounting member over a substantial length after fastener elements have been applied thereto and being formed with a series of recesses to accommodate the fastening elements associated therewith, and means for rotating said disk to move said mounting member along said track.

18. An applying machine including, in combination, means presenting a track for a mounting member, means for applying fastening elements to said mounting member, a disk to engage said mounting member over a substantial length after fastener elements have been applied thereto and being formed with a series of recesses to accommodate the fastening elements associated therewith, means for rotating said disk to move said mounting member along said track, means disposed adjacent said disk and providing a guide to retain said mounting member and fastening elements in contact therewith, and means providing a movable mounting for said guide.

19. An applying machine including a head, means for reciprocating said head, means providing a guide to receive a mounting member movable adjacent said head, means for moving said mounting member, means for delivering fastening elements to a point adjacent said head, means for pressing said fastening elements into contact with said mounting member, a pair of jaws underlying said head and movable into clamping contact with said fastening elements to secure the same to said mounting member, and cam surfaces extending between said jaws and head to project and retract the former into operative engagement with said elements.

20. An applying machine including a head, means for reciprocating said head, means providing a guide to receive a mounting member movable adjacent said head, means for moving said mounting member, means for delivering fastening elements to a point adjacent said head, means for pressing said fastening elements into contact with said mounting member, wedge blocks secured to said head, means for guiding said blocks, jaws for engagement with said fastening elements to force the same into clamping contact with said mounting member, and means presenting surfaces cooperating with said wedge blocks whereby as said head is reciprocated said jaws are moved into and out of operative engagement with said clamping elements.

21. An applying machine including a reciprocating head, means providing a guide for a mounting member movable in a position adjacent thereto, means for supplying fastening elements to said mounting member, means operated by said head for clamping said elements upon said member, and means associated with said head and having lost motion with respect thereto to press said elements into engagement with said mounting member prior to their clamping application thereto.

22. An applying machine including a reciprocating head, means providing a guide for a mounting member movable in a position adjacent thereto, means for supplying fastening elements to said mounting member, means operated by said head for clamping said elements upon said member, a presser rod to engage said fastening elements during such clamping operation to maintain the same in applying position with respect to said mounting member, and means providing a loose connection between said head and said rod whereby the latter will have a period of rest during the continued movement of said head, and will be periodically elevated from contact with said mounting member.

23. An applying machine including a reciprocating head, means providing a guide for a mounting member movable in a position adjacent thereto, means for supplying fastening elements to said mounting member, means operated by said head for clamping said elements upon said member, a rod engaging said fastening elements to maintain the same in position upon said mounting member and during the clamping operation, a bar connected to said rod and supporting elements extending from said head and periodically engaging said bar to lift the same and said rod.

24. An applying machine including a reciprocating head, means providing a guide for a mounting member movable in a position adjacent thereto, means for supplying fastening elements to said mounting member, means operated by said head for clamping said elements upon said member, a rod engaging said fastening elements to maintain the same in position upon said mounting member and during the clamping operation, a bar connected to said rod, supporting elements extending from said head and periodically engaging said bar to lift the same and said rod, and springs cooperating with said rod normally to maintain the same in a position engaging a fastening element applied to said mounting member.

25. An applying machine including a chute to receive fastening elements, a head, means for moving a mounting member with respect to said head, means associated with said head for applying said fastening elements to said mounting member, means associated with said chute for periodically delivering a fastening element to said applying means, and including a rotatable element, and means actuated by said head to operate said means to deliver fastening elements to said applying means.

26. An applying machine including a chute to receive fastening elements, a head adjacent the end of said chute, means for delivering fastening elements through said chute to said head, means for moving a mounting member adjacent said head, means associated with said head for applying the delivered fastening elements to said mounting member, means also actuated by said head to operate said delivery means, and means periodically rendering said last named means inoperative to interrupt the delivery of fastening elements through said chute.

27. An applying machine including a chute to receive fastening elements, a head adjacent the end of said chute, means for delivering fastening elements through said chute to said head, means for moving a mounting member adjacent said head, means associated with said head for applying the delivered fastening elements to said mounting member, means also actuated by said head to operate said delivery means, a rotatable element, means coupling the same to said head to drive the former, and means associated with said element and cooperating with the delivery means periodically to interrupt the actuation of the latter.

28. An applying machine including a chute to receive fastening elements, means for moving a mounting member adjacent said chute, a head, means for operating said head, applying means associated with said head for securing fastening elements to said mounting member, a rotatable delivery member associated with said chute, a pawl and ratchet structure associated with said head and delivery member to actuate the latter, and a cam moved by said head to cooperate periodically with said pawl and ratchet to cause the disengagement thereof whereby to interrupt the movements of said delivery means.

29. An applying machine including a chute to receive fastening elements, means for moving a mounting member adjacent the end of said chute, a head, means for moving said head, a base over which said mounting member moves, a pair of jaws supported upon said base to secure fastening elements to said mounting member, a wedge structure extending between said head and jaws periodically to move the latter towards and away from each other, and a fastener retaining means having lost motion with respect to said head and operated by the same to retain the elements upon said mounting member prior to the engagement of said jaws with a fastening element.

30. An applying machine including a chute to receive fastening elements, means for moving a mounting member adjacent the end of said chute, a head, means for moving said head, a base over which said mounting member moves, a pair of jaws supported upon said base to secure fastening elements to said mounting member, a wedge structure extending between said head and jaws periodically to move the latter towards and away from each other, a fastener retaining means having lost motion with respect to said head and operated by the same to retain the elements upon said mounting member prior to the engagement of said jaws with a fastening element, a delivery means associated with said chute to impel fastening elements towards said jaws, and means operated by said head periodically to interrupt the actuation of said delivery means.

31. An applying machine including a head, means for reciprocating said head, means providing a guide to receive a mounting member movable adjacent said head, means for moving said mounting member, means for delivering fastening elements to a point adjacent said head, means for pressing said fastening elements into contact with said mounting member, and means operated by said head to clamp said fastening elements to said mounting member.

32. An applying machine including a reciprocating head, means providing a guide for a mounting member movable adjacent thereto, means for delivering fastening elements to a point adjacent said head, means operated by said head to interrupt periodically the supply of fastening elements, means for clamping the elements into engagement with said mounting member, and means for moving said member.

33. An applying machine including means providing a guideway for a mounting member, means for moving said mounting member through said guideway, a head, means for delivering fastening elements to a point adjacent said head, means for operating said head to apply the fastening elements along the edge of said mounting member, and means also operated by said head to interrupt the delivery of fastening elements to said applying means.

34. An applying machine including a head, means for operating the same, means for delivering fastening elements to said head, means for moving a mounting member adjacent said head, means actuated by said head to apply said fastening elements to said mounting member, and means for interrupting the delivery of said fastening elements to said applying means.

35. In a machine for applying slide fastener elements of the type comprising a generally flat body having diverging arms at one end, constituting attaching jaws for engagement with the edge of a mounting member and an interlocking portion adapted to project from the edge of said mounting member, means for supporting and guiding said mounting member, means to move said mounting member step by step in the direction of the length thereof through said supporting and guiding means, means for feeding said fastener elements from bulk to the machine in orderly arrangement including a chute adapted to receive a quantity of elements, means for successively moving said elements from said chute into attaching position relative to the edge of said mounting member with the attaching jaws on opposite sides thereof, and means for successively pressing said jaws on said mounting member between successive movements of said mounting member moving means.

36. In a machine for applying slide fastener elements to the edge of a mounting member, each element comprising a generally flat body having spaced apart jaws at one end and at the other end an interlocking projection on one side and a depression on the opposite side, the combination with feeding mechanism for moving the mounting member, of devices for receiving formed fastener elements en masse and arranging them in orderly fashion with the jaw ends all extending in the same direction and the projections and recesses all in the same relative positions, means for placing the elements in position to be applied to the mounting member with their jaw ends astride an edge of said mounting member, and means engageable with the jaws of the elements on opposite sides of the mounting member for pressing said jaws together to grip the edge of said mounting member.

37. In a machine for receiving fastener elements in bulk and feeding them in orderly arrangement, such elements each comprising a generally flat body having spaced apart jaws at one end and at the other end an interlocking projection on one side and a corresponding depression on the opposite side, a hopper for receiving a quantity of said elements en masse, a chute, devices associated with said hopper for feeding elements from the hopper to said chute, and means including said chute for feeding elements with all the jaws extending in the same direction and all the heads facing in the same direction to a carrier and for spacing them at uniform distances apart along the carrier.

38. In apparatus for applying fastener elements to the edge of a mounting member in the manufacture of a slide fastener stringer, each element having spaced apart jaws at one end and at the other end an interlocking projection on one side and a corresponding depression on the opposite side, the combination with means for supporting and holding a mounting member under tension, of a container for formed fastener elements in bulk, devices for taking elements from the container and arranging them in orderly fashion with the jaw ends all extending in the same direction and the projections and recesses all in the same relative positions, means for placing the elements in position to be applied to the mounting member with their jaw ends astride an edge of said mounting member, and means for pressing the jaws of said elements together to grip the edge of said mounting member.

39. In apparatus for applying fastener elements to the edge of a mounting member in the manufacture of a slide fastener stringer, each element having spaced apart jaws at one end and at the other end an interlocking projection on one side and a corresponding depression on the opposite side, a hopper for receiving en masse a quantity of elements so formed, devices associated with said hopper including a chute for feeding elements from said hopper in orderly arrangement, means for supporting and maintaining a mounting member under tension, and means for receiving fastener elements from the delivery end of said chute and placing them in positon to be applied to the mounting member with their jaw ends astride an edge of said mounting member, and means for pressing said jaws together to grip the edge of said carrier.

40. The herein described method of manipulating slide fastener elements of the type having a generally flat body with spaced apart jaws at one end and at the other end an interlocking projection on one side and a corresponding depression on the opposite side, which consists in placing said elements en masse in a receptacle, taking elements from said receptacle, arranging at least some of them in orderly fashion, feeding the arranged elements into position to be applied to a mounting member with their jaw ends astride the edge of said mounting member while said mounting member is supported under tension, and thereafter compressing such jaws together to grip the edge of said mounting member.

41. In a machine for receiving fastener elements in bulk and feeding them in orderly arrangement in the manufacture of slide fasteners, such elements each comprising a generally flat body having spaced apart jaws at one end and at the other end an interlocking projection on one side and a depression on the opposite side, a hopper for receiving a quantity of said elements en masse, means for rotating said hopper, a chute having a slotted portion extending into said hopper adapted to receive fastener elements when said hopper is rotated, the slot being slightly wider than the thickness of the body portion of said elements but narrower than the combined thickness of said element and said projection whereby an element in said slot is suspended from said projection with said jaw end hanging downwardly, and means associated with said chute for selecting only those elements which have their projections in the same relative position.

42. In apparatus for receiving fastener elements in bulk and feeding them in orderly arrangement in the manufacture of slide fasteners, such elements each comprising a generally flat body having spaced apart jaws at one end and at the other end an interlocking projection on one side and a depression on the opposite side, a hopper for receiving a quantity of said elements en masse, means for rotating said hopper, a chute having an inclined slotted portion extending into said hopper, baffles on the interior of said hopper for elevating said elements over said chute, a guide shelf for guiding fastener elements to the slot, said slot being wide enough to allow entrance of the jaw end but to prevent passage of the projection end whereby such elements as are caught in said slot are suspended on the sides thereof by their projections, means for rejecting such elements from said chute as are not in the desired positions including means for removing elements which have only one jaw engaged in said slot, and a notch in the side of said slot for dropping out those elements which do not have their projections in the desired relative positions.

43. The combination defined in claim No. 42 wherein said means for removing such elements from the chute as have only one jaw engaged therein comprises a plurality of pointed fingers carried by said chute and extending adjacent said slot and substantially parallel thereto.

44. The mechanism defined in claim No. 42 wherein the sides of said chute are provided with hardened, ground and polished surfaces to reduce friction to a minimum.

45. The mechanism defined in claim No. 42 wherein said chute comprises substantially two parallel bars spaced apart to define a slot between the same, said bars adjacent said slot having a relatively thin upstanding edge on which the projections of said elements are supported during their movement along said chute.

46. In apparatus for receiving multiple fastener elements in bulk and feeding them in orderly arrangement, such elements each comprising a generally flat light weight body having spaced apart jaws at one end and at the other end an interlocking projection on one side and a depression on the other side, a hopper for receiving a quantity of said elements en masse, a chute having an inclined portion extending from said hopper and presenting a slot, means for delivering fastener elements to said chute whereby they may ride with their bodies within said slot supported by the projections thereof on the walls of said slot, and means for vibrating said chute at a relatively high speed of the order of 5,000 to 10,000 vibrations per minute to cause said fastener elements to gravitate along said slot.

47. In a machine for applying series of fastening elements on a mounting member, feeding means for intermittently moving said mounting member, means for feeding and placing fastening elements adjacent one edge of said mounting member, means for operating said feeding and placing means over a complete cycle during each movement of said mounting member, means for applying said elements to the edge of said member, and means for periodically interrupting the operation of said fastener element feeding and placing means while said intermittent tape feeding means continues in operation whereby said fastening elements will be disposed in groups along one edge of said mounting member.

48. A machine for applying a series of fastening elements on a mounting member including means for moving said mounting member, means for holding fastener elements in orderly arrangement, means for releasing said elements individually from said holder and for placing the same adjacent one edge of said mounting member, means for applying said fastener elements to said mounting member, and means for periodically interrupting the operation of said releasing means while the movement of said mounting member continues whereby said fastening elements will be disposed in groups along one edge of said mounting member.

49. The method of making stringers for slide fasteners of the type having a mounting member and a plurality of interlocking elements each having at one end a pair of jaws clamped to the edge of the mounting member and an interlocking head projecting from the mounting member, which consists in manipulating a loose mass of fastener elements to arrange elements from the mass with all the jaws extending in the same direction and all the heads facing in the same direction, and then feeding said elements one by one to the edge of an intermittently moving mounting member, and clamping them to the mounting member while the latter is stationary.

50. A machine for applying to the edge of a mounting member fastener elements each having at one end a pair of spaced jaws and at the other end an interlocking head, comprising in combination means for manipulating a bulk mass of fastener elements and arranging elements from the mass with all the jaws extending in the same direction and all the heads facing in the same direction, means for intermittently moving the mounting member, means for feeding the elements one by one to the edge of the mounting member and means for clamping the elements thereon.

51. In a machine for manipulating fastener elements of the type having a pair of spaced jaws at one end and an interlocking head at the other end, a container for elements in bulk, holding means for the elements, means for delivering the elements from the container to the holding means with all the jaws extending in the same direction and all the heads facing in the same direction, and means for delivering the elements from the holding means to a carrier and for spacing them at uniform distances apart along the carrier.

52. The herein described method of manipulating slide fastener elements of the type having spaced apart jaws at one end and an interlocking head at the other end which consists in placing said elements en masse in a receptacle, feeding elements from said receptacle in orderly arrangement, transferring said elements in position to be applied to a mounting member with their jaw ends astride said mounting member, and thereafter compressing said jaws together to grip the edge of said mounting member.

In testimony whereof I affix my signature.
ROSCOE J. SMITH.